Nov. 22, 1960     C W. MUSSER     2,961,006
FOUR-WAY VALVE
Filed Feb. 26, 1958     2 Sheets-Sheet 1
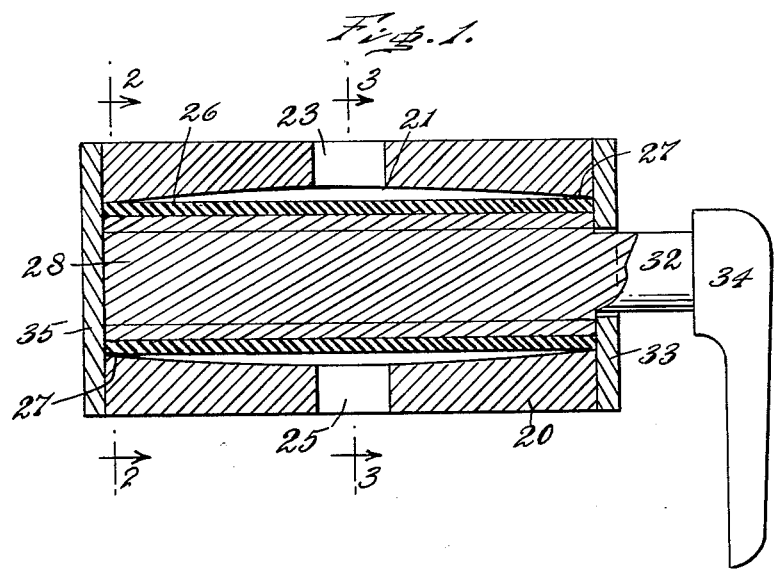
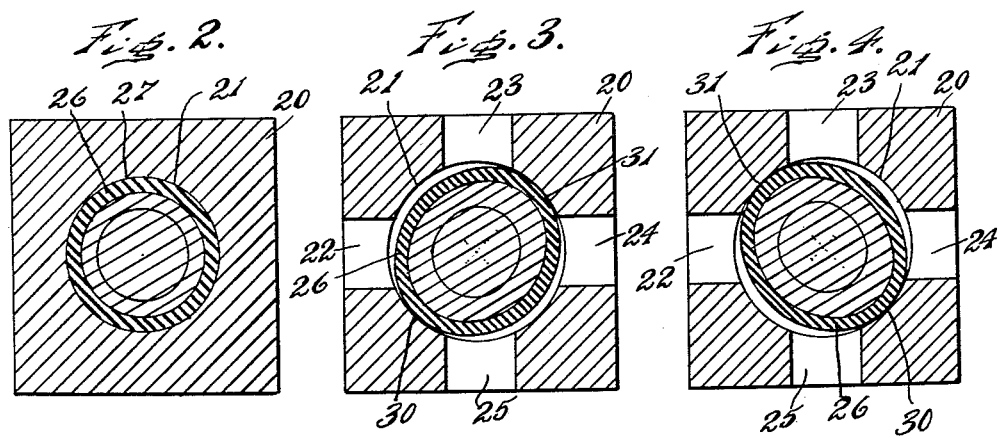
INVENTOR
C. Walton Musser
BY
ATTORNEYS

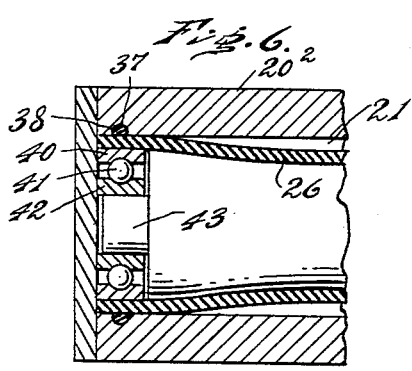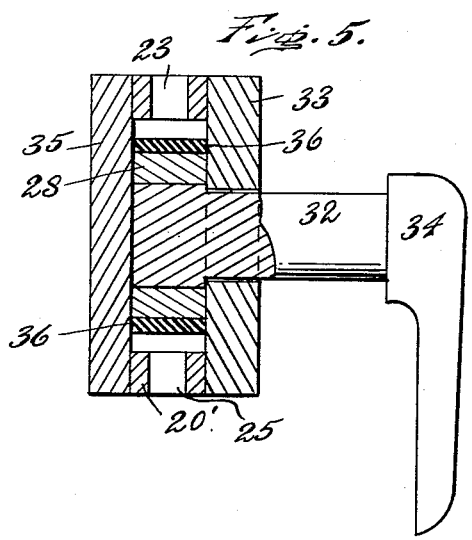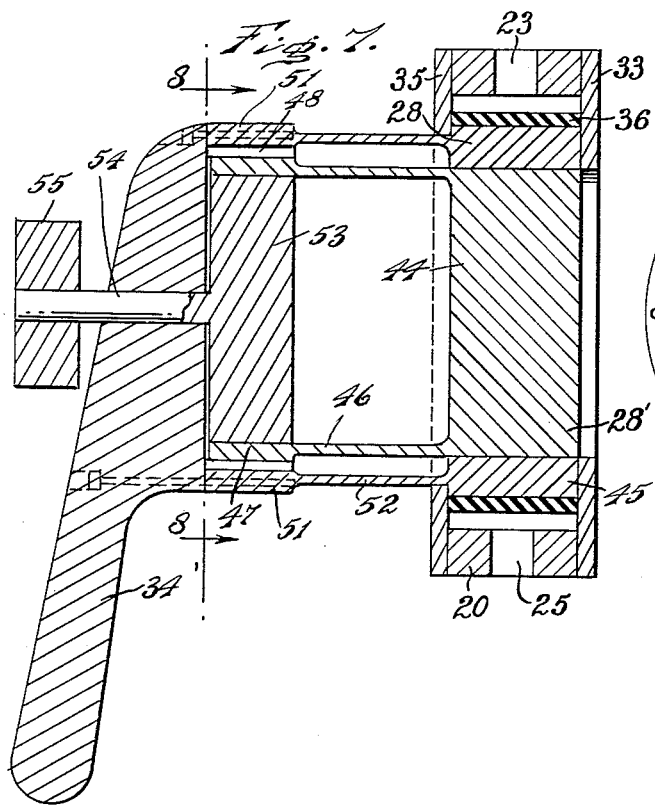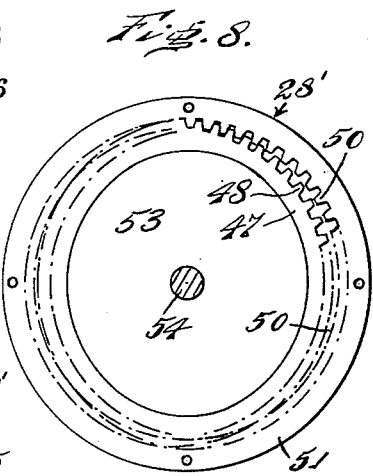

United States Patent Office 2,961,006
Patented Nov. 22, 1960

2,961,006

FOUR-WAY VALVE

C Walton Musser, Beverly, Mass., assignor to United Shoe Machinery Corporation, Flemington, N.J., a corporation of New Jersey Filed Feb. 26, 1958, Ser. No. 717,707

6 Claims. (Cl. 137—625.43)

The present invention relates to valves, particularly of the character commonly known as four-way valves.

A purpose of the invention is to provide hermetic sealing in a four-way valve.

A further purpose is to employ a flexible valve element which seals at opposing positions against the interior of a valve casing and to move the sealing position.

A further purpose is to deflect a valve element into sealing engagement with the circular interior of a valve casing by an elliptoidal wave generator.

A further purpose is to seal the valve element at the ends against the casing.

A further purpose is to employ a wave generator which is of elliptoidal cross section at the center and circular cross section at the ends.

A further purpose is to seal the ends of the valve element against end plates.

A further purpose is to mount the wave generator on a bearing at the end, which bearing holds the valve element against an exterior seal.

A further purpose is to adjust the sealing contact pressure of the valve element against the casing.

Further purposes appear in the specification and in the claims.

In the drawings, I have chosen to illustrate a few only of the numerous embodiments in which the invention may appear, selecting the forms shown from the standpoints of convenience in illustration, satisfactory operation and clear demonstration of the principles involved.

Figure 1 is an axial section of a four-way valve in accordance with the invention, having hermetic sealing at the ends.

Figure 2 is a section on the line 2—2 of Figure 1.

Figures 3 and 4 are sections on the line 3—3 of Figure 1 showing the valve in different adjusted positions.

Figure 5 is an axial section of a modified valve in accordance with the invention.

Figure 6 is an axial section showing a modified valve end construction.

Figure 7 is a diagrammatic axial section of an adjuster for the wave generator, applied to a valve of the character shown in Figure 5.

Figure 8 is a section on the line 8—8 of Figure 7.

Describing in illustration but not in limitation and referring to the drawings:

The present invention is concerned with an improved four-way valve which provides the advantage of hermetic sealing, and essentially rolling rather than sliding engagement.

In accordance with the invention a flexible valve is deformed into engagement with the interior of a valve casing at appropriately spaced points so as to selectively seal and isolate desired valve ports from one another, while connecting other valve ports.

The invention may be applied to a form in which the valve element is hermetically sealed to the casing at the ends or in a form in which the valve element seals by engagement with end plates.

The invention is also applicable to a form in which the valve element at the ends is sealed by packing means, desirably urged into proper engagement by a bearing.

In accordance with the invention, where desired, the sealing pressure can be adjusted, in accordance with the fluid pressure, or other valve operating conditions.

Considering first the form of Figures 1–4, a valve casing 20 has an internal bore 21 of circular cross section, which progressively increases in diameter from the ends towards the middle, and has at the middle suitable radial ports or fluid connections 22, 23, 24 and 25, desirably equally spaced around the circumference.

Within the casing and extending longitudinally is a flexible tubular valve element 26 which is initially of suitably circular tubular contour, and conforms at the ends to the interior of the casing. In a form in which the casing is of metal such as stainless steel, steel or bronze, and the valve element 26 is also of similar metal, the casing and the valve element are desirably united at the ends as by welding or brazing at 27. Where the casing is of metal or of plastic, and the valve element is of rubber, synthetic rubber or other elastomer, such as nylon, polytetrafluorethylene, or the like, the valve element is simply sealed at the end by a squeeze or pressure fit as later discussed in some detail.

Inside the valve element is a wave generator 28 (suitably consisting of inner and outer pieces force fitted together) which is suitably of rigid material like steel or stainless steel, is elliptoidal in cross section at the middle and circular in cross section at the ends, and engages the interior of the valve element. Thus at the middle there are two points of sealing 30 and 31 of the valve element against the interior of the casing, the sealing pressure being determined by the force exerted by the wave generator.

The manner of assembly of the wave generator and the valve element is disclosed in detail in my copending application Serial No. 717,709, filed February 26, 1958, for Wave Generator, now U.S. Patent No. 2,930,253, granted March 29, 1960. If preferred the valve element can simply be forced over the wave generator, and the valve casing can be split and bolted or welded together.

When reference has been made to elliptoidal contour, it is intended to indicate that the condition is that created by two sine waves superimposed on a circle in 360°, with the crossing points (points of zero deflection) displaced 90°. The maximum displacement from the circle at the high points equals the minimum displacement of the troughs of the wave.

This configuration assures adequate sealing at each lobe.

The position of the wave generator can be shifted in any suitable manner, as by extending a shaft 32 through an opening in end plate 33 secured to the casing and providing an adjustment handle 34 on the end, the opposite end being sealed by end plate 35, secured to the casing.

Thus, as shown in Figures 3 and 4, with the valve in one position, ports 22 and 23 connect and ports 24 and 25 connect, while ports 22, 23 are separated from ports 24, 25. With the valve in the opposite position, ports 23 and 24 connect, and ports 22 and 25 connect, while ports 23, 24 are separated from ports 22, 25.

In some cases it is unnecessary to extend the valve elements so as to obtain sealing at the ends against the casing at 27, and in the form of Figure 5, I provide sealing at 36 by the valve element engaging endwise under compression against the end plates 33 and 35 secured to the casing, while the casing 20' in effect comprises the center portion of the casing 20.

A modified form of end seal with provision for bearing support of the wave generator is shown in Figure 6, where the casing $20^2$ has an annular internal sealing recess 37 for an O ring 38 which engages annularly around the outside of the valve element 26 and is interiorly supported and held in sealing position by outer race 40 of antifriction bearing 41, the inner race 42 of which receives a boss 43 on one end of the wave generator.

In some cases it is desirable to be able to adjust the sealing contact pressure of the valve against the casing. In the form of Figures 7 and 8, the wave generator 28' comprises an inner elliptoidal section 44 and an outer surrounding close fitting deflectable ring-like section 45, the interior of the outer section engaging the outside of the inner portion. The interior of the outer section 45 when undeflected is circular, but the outside when undeflected is still elliptoidal. The two elliptoidal portions have a difference between the major axis dimension and the minor axis dimension which may be equal when undeflected, in which case when the elliptoids are one within another and disposed 90° with respect to one another, they will cancel out and form a circle, whereas at other positions they will form an exterior elliptoid of varying amplitude. The construction and operation of the gearing shown herein is shown in my U.S. Patent No. 2,906,143, granted September 29, 1959, for Strain Wave Gearing. The inner wave generator element 44 is connected by a flexible tube 46 with a flex gear 47 whose exterior teeth 48 engage interior teeth 50 at suitably two diametrally spaced points on an internal ring gear 51 which is connected by flexible tube 52 with the other wave generator element 45. The teeth 48 and 50 are of the same tooth form, but there is a difference in the number of teeth which corresponds to or is a multiple of the number of points of engagement of the flex gear (in this case two). The flex gear is deflected into position by opposing engagement (with intermediate nonmating positions) by an elliptoidal wave generator 53 which is turned by a shaft 54 and handle 55 accessible beyond the valve, and suitably passing through an opening in handle 34' which is connected with the ring gear 51 to adjust it.

It will be evident that by turning the handle 55, the relative angular relation of the wave generator portions 44 and 45 changes, while by turning handle 34' the valve is set in any predetermined position. The handle 55 can suitably be adjusted where sealing contact pressure should be changed in view of a change in operative fluid pressure in the valve, or to correct for wear.

In view of my invention and disclosure, variations and modifications to meet individual whim or particular need will doubtless become evident to others skilled in the art to obtain all or part of the benefits of my invention without copying the valve shown, and I, therefore, claim all such insofar as they fall within the reasonable spirit and scope of my claims.

Having thus described my invention, what I claim as new and desire to secure by Letters Patent is:

1. In a valve, a casing having an interior space of circular cross section having an axis, there being ports circumferentially distributed around the casing and connecting to the interior space at circumferentially spaced locations, a flexible valve element coaxial with the casing adapted to deflect and engage the interior of the casing, means for sealing the flexible valve element against the casing at the ends of the valve elements, a wave generator coaxial with the casing within the valve element engaging the interior of the valve element and having at least two lobes which extend radially outwardly beyond other parts of the circumference of the wave generator, the lobes deflecting the flexible valve element outwardly and the flexible valve element at a given rotational position of the wave generator being in engagement with the casing at one location and also at another location circumferentially spaced around the casing, the locations of engagement with the casing as the wave generator rotates being adapted to change the flow between different ports, there being flow provided between at least one pair of ports in the radial space between the casing and the flexible valve element, and means for rotating the wave generator to shift the locations of engagement of the flexible valve element with the casing.

2. A valve of claim 1, in which the interior space of the casing is of circular contour at both ends and increases in diameter and remains of circular contour toward the middle, the wave generator is of circular cross section at the ends and the wave generator is of elliptoidal cross section at the middle.

3. A valve of claim 2, in combination with means for changing the sealing contact pressure by the wave generator against the valve element at said two locations.

4. A valve of claim 1, in combination with means for changing the sealing contact pressure by the wave generator against the valve element at said two locations.

5. A valve of claim 1, in combination with a gasket surrounding the flexible valve element at the end and bearing means supporting the interior of the flexible valve element against the gasket and journalling the wave generator.

6. In a valve, a casing having an interior contour which progressively increases in diameter from both ends toward the middle and which is of circular cross section and has an axis, there being ports extending into the interior of the casing adjacent the middle and distributed around the circumference, a flexible valve element coaxial with the casing extending longitudinally within the casing, fixed rotationally with respect to the casing at both ends and adapted to deflect and engage the interior of the casing intermediate the ends, a wave generator which is circular in cross section at the ends and which is elliptoidal in cross section intermediate the ends, the wave generator being located inside the valve element in engagement with the interior of the flexible valve element, the lobes of the elliptoidal portion of the wave generator deflecting the flexible valve element into engagment with the interior of the casing at two diametrically opposite positions and the flexible valve element being spaced from the interior of the casing at positions intermediate said positions of engagement, and means for turning the wave generator to shift the said points of engagement of the casing with the valve element.

References Cited in the file of this patent

UNITED STATES PATENTS

| 2,023,349 | Whittle | Dec. 3, 1935 |
| 2,872,944 | Ludwig | Feb. 10, 1959 |

FOREIGN PATENTS

| 623,696 | Great Britain | of 1949 |
| 143,999 | Sweden | of 1954 |
| 713,999 | Great Britain | Aug. 18, 1954 |